US008869679B2

(12) United States Patent  
Ryan et al.

(10) Patent No.: US 8,869,679 B2  
(45) Date of Patent: Oct. 28, 2014

(54) AUTOMATIC POWER SHUT-OFF TO AT LEAST A PORTION OF A COOKING APPARATUS

(75) Inventors: John J. Ryan, Independence, KY (US); Ronald R. Weiss, Okeana, OH (US)

(73) Assignee: Gold Medal Products Company, Cincinnati, OH (US)

( * ) Notice: Subject to any disclaimer, the term of this patent is extended or adjusted under 35 U.S.C. 154(b) by 579 days.

(21) Appl. No.: 12/575,561

(22) Filed: Oct. 8, 2009

(65) Prior Publication Data

US 2011/0083562 A1    Apr. 14, 2011

(51) Int. Cl.
- *A47J 27/62* (2006.01)
- *A47J 37/06* (2006.01)
- *H05B 1/02* (2006.01)
- *A23L 1/18* (2006.01)

(52) U.S. Cl.
CPC ............... *H05B 1/0261* (2013.01); *A23L 1/18* (2013.01)
USPC .................. 99/333; 99/332; 99/338; 219/482; 219/492; 219/497

(58) Field of Classification Search
USPC ............ 99/332, 333, 331, 337, 338; 219/482, 219/490, 492, 494, 497, 507, 510
See application file for complete search history.

(56) References Cited

U.S. PATENT DOCUMENTS

| | | | |
|---|---|---|---|
| 4,492,841 A * | 1/1985 | Delius | 219/69.1 |
| 4,636,949 A * | 1/1987 | Longabaugh | 700/90 |
| 4,894,518 A * | 1/1990 | Ishikawa et al. | 219/413 |
| 6,352,731 B1 | 3/2002 | Weiss | |
| 6,672,201 B2 | 1/2004 | Evans, Sr. et al. | |
| 7,786,410 B2 * | 8/2010 | Zhang et al. | 219/441 |
| 2006/0081615 A1 * | 4/2006 | Kataoka et al. | 219/622 |
| 2008/0092750 A1 * | 4/2008 | Leveque | 99/333 |
| 2008/0121114 A1 | 5/2008 | Ryan et al. | |

* cited by examiner

*Primary Examiner* — Reginald L Alexander  
(74) *Attorney, Agent, or Firm* — Wood, Herron & Evans, LLP

(57) ABSTRACT

Methods to control power to a cooking appliance are provided. The methods include monitoring a power signal to the portion of the cooking appliance, including monitoring a current and/or voltage of the power signal. The methods also include selectively interrupting power to the portion of the cooking appliance in response to: determining that the current fails to exceed a current threshold within a time threshold, determining that the voltage fails to exceed a voltage threshold within a time threshold, determining that the current exceeds a current threshold for a first time threshold but fails to exceed the current threshold for a second time threshold, and determining that the voltage exceeds a voltage threshold for a first time threshold but fails to exceed the voltage threshold for a second time threshold. The methods also include temperature sensing and controlling the power signal based thereupon.

20 Claims, 8 Drawing Sheets

AUTOMATIC POWER SHUT-OFF TO AT LEAST A PORTION OF A COOKING APPARATUS

FIELD OF THE INVENTION

The present invention relates to cooking appliances, and, more particularly, to the control of power to portions thereof.

BACKGROUND OF THE INVENTION

Popcorn is often mass-produced for sale at movies and other events in commercial popcorn poppers which generally include an enclosed, transparent cabinet containing a tillable kettle suspended above a catch area or platform. The kettle is heated and uncooked popcorn kernels are placed therein to be cooked and popped. Oil, salt and other flavorings might also be added to the kettle for flavoring the popcorn in the popping process. Once the kernels are popped, the kettle is tilted, either manually or automatically, and the popcorn spills onto the platform to be scooped up, packaged and sold to customers. More recently, and especially as home movie theaters have gained in popularity, popcorn poppers have begun to move into the residential market for residential consumption as well. In the residential market, the residential popcorn poppers are often used to make smaller batches of popcorn.

However, in the commercial or residential setting a popcorn popper is often left unattended. For example, a user may make loads of popcorn then, when finished, simply leave the popcorn popper. As such, the heating element of the popcorn popper may continue to be powered and give off heat. This may result in remainders of previous loads (e.g., crumbs and/or other residual content of previously popped loads of popcorn) becoming charred and producing smoke. Moreover, over time this may result in a buildup of material on the kettle that imparts an unappetizing flavor to subsequent loads of popcorn. Thus, it may be desirable to reduce the likelihood of smoke being produced and the buildup of material.

SUMMARY OF THE INVENTION

Embodiments of the invention provide a method to control power to at least a portion of a cooking appliance. One method includes monitoring a power signal to a cooking appliance, including monitoring a current of the power signal, and in response to determining that the current has failed to exceed a current threshold within a time threshold, selectively interrupting power to at least a portion of the cooking appliance. Another method includes monitoring a power signal to at least a portion of the cooking appliance, including monitoring a voltage of the power signal, and in response to determining that the voltage has failed to exceed a voltage threshold within a time threshold, selectively interrupting the power signal to the at least a portion of the cooking appliance. Yet another method includes monitoring a power signal to a cooking appliance, including monitoring a current of the power signal, and in response to determining that the current has exceeded a current threshold for a first time threshold but failed to exceed the current threshold for a second time threshold, selectively interrupting power to at least a portion of the cooking appliance. Still another method includes monitoring a power signal to at least a portion of a cooking appliance, including monitoring a voltage of the power signal, and in response to determining that the voltage has exceeded a voltage threshold for a first time threshold but failed to exceed the voltage threshold for a second time threshold, selectively interrupting the power signal to the at least a portion of the cooking appliance. Finally, another method includes monitoring a temperature associated with a cooking appliance, and in response to the temperature exceeding a temperature threshold for a time threshold, selectively interrupting power to at least a portion of the cooking appliance.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various preferred features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding.

DETAILED DESCRIPTION

Figure 1:
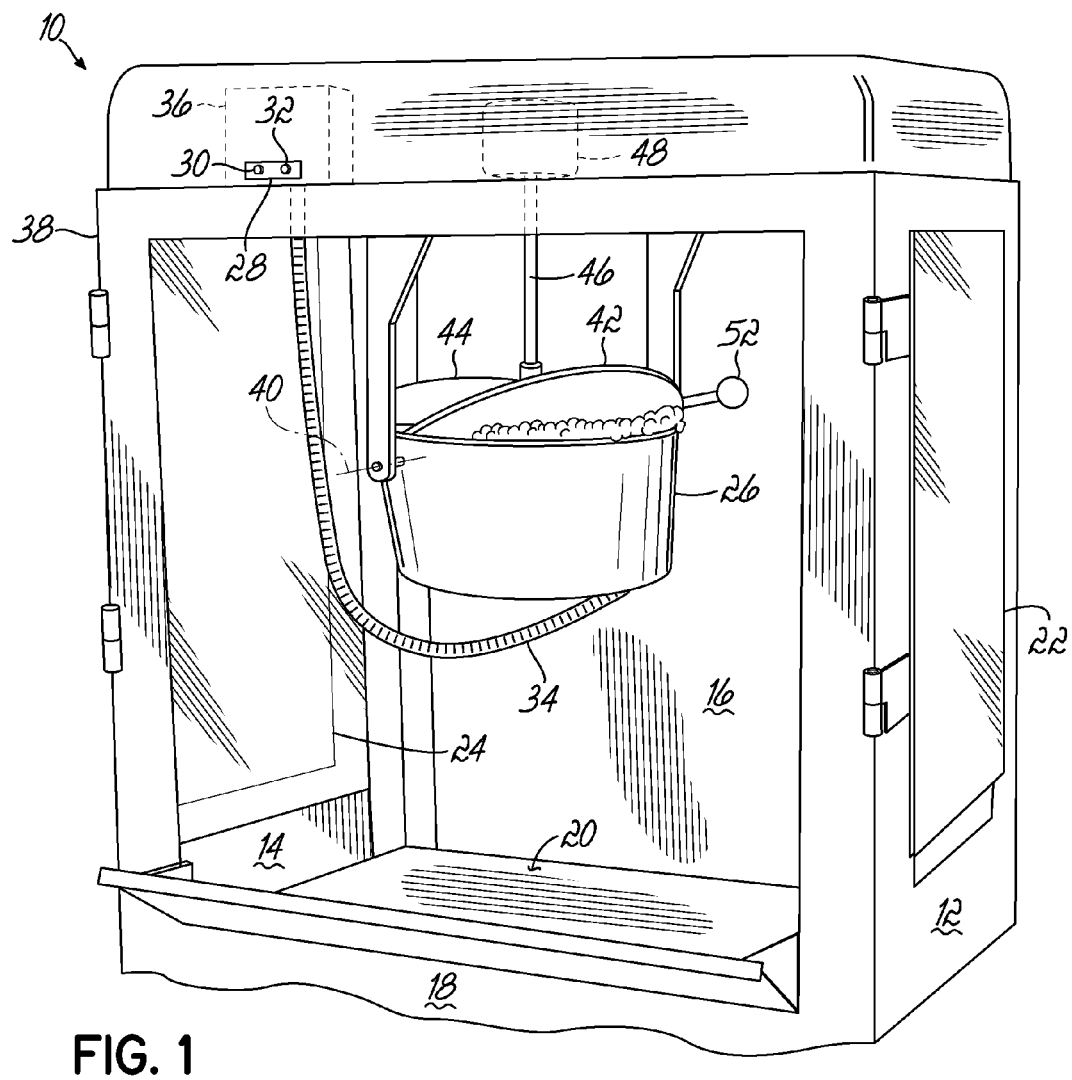
FIG. 1 is diagrammatic illustration of a cooking appliance consistent with embodiments of the invention.

Turning to the drawings, wherein like numbers denote like parts throughout the several views, FIG. 1 is a diagrammatic illustration of at least a portion of a cooking appliance 10 (also referred to as a cooking apparatus 10), which in specific embodiments may be a commercial cooking apparatus, such as a popcorn cooking apparatus 10 (hereinafter, "apparatus" 10). It will be appreciated that the apparatus 10 is merely illustrative, and that embodiments of the invention may be utilized with a cooking apparatus other than a popcorn popping apparatus, such as a fryer, an oven, a baker, an immersion circulator, etc.

In some embodiments, the apparatus 10 includes a cabinet having at least partially transparent walls, including two sidewalls 12, 14, a rear wall 16, front wall 18, and a service platform 20 for catching popcorn. Front wall 18 may include two doors 22, 24, which can be opened to gain access to the popped corn and/or platform 20 of the cabinet and to a kettle 26. Sidewalls 12, 14 and rear wall 16, as well as the front wall 18 and/or doors 22, 24 may be at least partially constructed of a transparent glass or plastic material such that the interior of the cabinet can be viewed from the exterior.

The apparatus 10 may further include an control panel 28 mounted on the cabinet that includes at least one operating switch 30 and/or at least one indicator light 32 for turning the apparatus 10 on and indicating a problem, respectively. Additionally, the apparatus 10 may further include a heating element (not shown) to heat the kettle 26 and contents therein and/or a warmer (not shown) positioned under the platform 20 to keep popcorn positioned thereupon or thereabove warm. It will be appreciated that the control panel 28 may include more or fewer switches and indicator lights as necessary.

The heating element may receive power through a control line 34 connected to a controller 36 mounted on the top 38 of the cabinet. The 36 may receive power in the form of a power signal to supply to at least the heating element and to control the power supplied thereto. The controller 36 may also be coupled to the indicator light 32 of the control panel 28 for the selective activation thereof. In some embodiments, the controller 36 may be configured to monitor a power signal, and in particular a component of the power signal (such as the current or voltage) to determine whether to automatically shut down power to the heating element of the apparatus 10. In alternative embodiments, the controller 36 may be configured to monitor the temperature of at least a portion of the kettle 26 to determine whether to automatically shut down power to the heating element of the apparatus 10. The controller 36 may also be configured to selectively activate indicator light 32 in the event of a problem and/or fault.

The kettle 26 may be tiltable about a tilt axis 40 and is provided with at least one cover (as illustrated in FIG. 1, covers 42 and 44), which may be configured to be pivotable on the kettle 26. When corn is popped, it pushes at least one cover 42, 44 open and falls onto platform 20. Moreover, it will be appreciated that cover 42 is located over a so-called "dump section" or side of the kettle 26. When the kettle 26 is tilted, this cover 42 pivots open to facilitate dumping of popcorn onto platform 20.

The kettle 26 may include an internal agitator, stir blade or rotor (not shown) driven by a rotor drive shaft 46 and rotated by a stir motor 48. The rotor drive shaft 46 may have an upper end that includes a gear (not shown) configured to intermesh with a drive gear (not shown) rotated by the stir motor 48. The stir motor 48 may be activated by an appropriate switch on the control panel 28. Alternatively, the stir motor 48 may be activated by a controller (e.g., controller 36 or another controller configured to control at least a portion of the apparatus 10) and/or automatically in response to power being supplied to the apparatus 10 and/or heating element.

The kettle 26 may be mounted in the cabinet of the apparatus 10 by way of at least one hanger bracket 50. Each hanger bracket 50 may be configured to be attached to the top 38 of the cabinet and maintain the kettle 26 above the platform 20. The kettle 26 may include a handle 52 that can be used to tilt the kettle 26 to dump popped popcorn.

The controller 36 is configured to monitor the current drawn by at least the heating element and/or to monitor the temperature of the kettle 26 and interrupt power to the heating elements upon detecting that the apparatus 10 is idle. Moreover, the controller 36 may be configured to selectively activate the indicator light 32 to indicate that the apparatus 10 is idle. In some embodiments, the controller 36 is configured as a separate unit from another controller (not shown) that may be configured to control the operations of the apparatus 10. For example, the controller 36 may be an "override" controller configured in an attempt to prevent dangerous situations. Specifically, when the apparatus 10 is idle the heating elements thereof may be activating, which could potentially lead to a tire or other dangerous situation. As such, the controller 36 may be configured to separately control power to the heating element and/or indicator light 32 in addition to another controller configured to control power to the heating element. The other controller may also control power to the motor 48, warmer, a pump for oil (not shown), a motor to automatically dump popcorn from the kettle 26 (not shown), another indicator (such as a buzzer or light), a ventilator, and/or other components of the apparatus 10.

In alternative embodiments, the controller 36 is configured with, or as a part of, another controller that may be configured to control the operations of the apparatus 10. Thus, it will be appreciated that the apparatus 10 and/or controller 36 are not intended to limit the scope of embodiments of the invention. In particular, the apparatus 10 may include additional components consistent with embodiments of the invention. For example, the apparatus 10 may include a pump for oil, an oil reservoir, a motor to automatically dump popcorn from the kettle 26 when that popcorn is finished cooking, an indicator, at least one additional controller (e.g., a temperature controller to control the popping of popcorn, an apparatus controller to control the apparatus 10 and/or components thereof, etc.), a temperature measuring device (e.g., such as a thermostat, a thermistor, a thermocouple, etc.), a ventilator, and/or another component consistent with embodiments of the invention. As such, the apparatus 10 may include any popcorn popping apparatus as distributed by Gold Medal Products Co. of Cincinnati, Ohio. Alternatively, the apparatus 10 may include any cooking apparatus, including a fryer, baking unit, oven, and/or other cooking apparatus consistent with embodiments of the invention.

Figure 2:
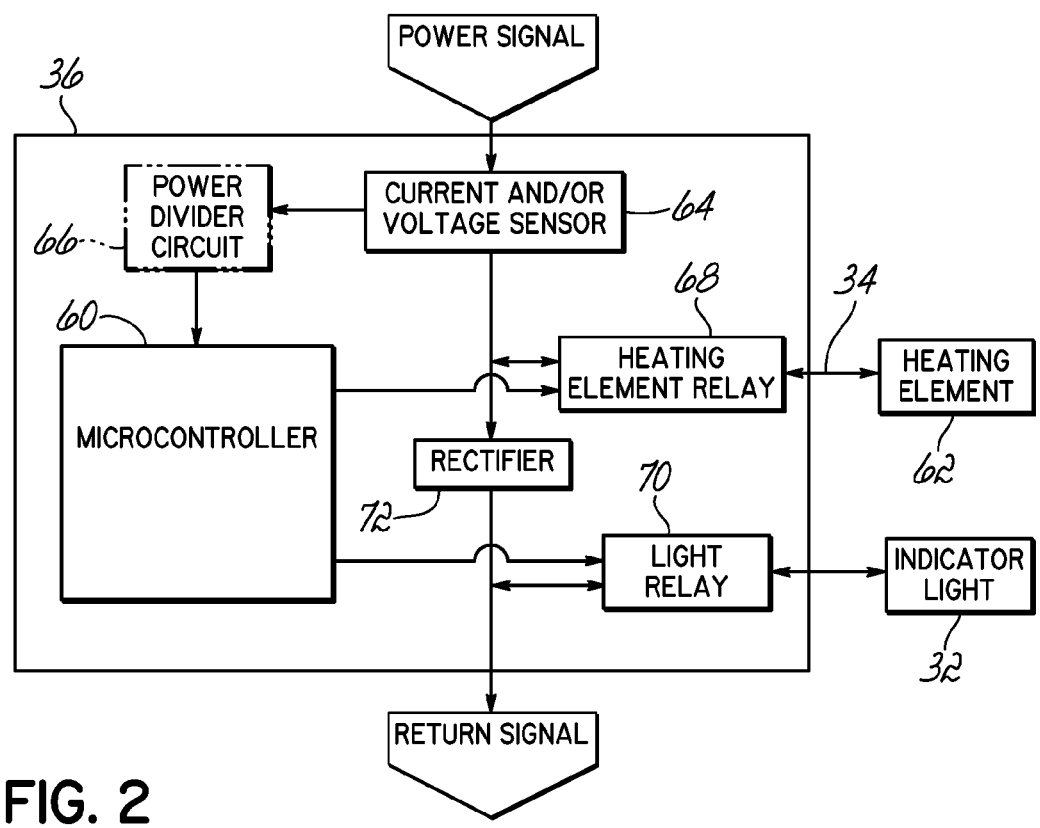
FIG. 2 is a block diagram of a controller than may be used with the cooking appliance of FIG. 1.

FIG. 2 is a diagrammatic illustration of one embodiment of a controller 36 consistent with embodiments of the invention. The controller 36 may include at least one microcontroller 60 configured to control the coupling of a power signal to a heating element 62 (e.g., such as through control line 34) and/or indicator light 32. Each microcontroller 60 is typically implemented in hardware using circuit logic disposed in one or more physical integrated circuit devices, or chips. In specific embodiments, the microcontroller 60 is a CMOS microcontroller, such as a PIC12F675 microcontroller as distributed by Microchip Technology, Inc., of Chandler, Ariz. The microcontroller 36 is configured to determine the current and/or voltage of a power signal coupled to the heating element 62 through at least one current and/or voltage sensor 64. In specific embodiments, the current and/or voltage sensor 64 may include at least one RL-3430 current sensor as distributed by Renco Electronics, Inc., of Rockledge, Fla. In alternative embodiments, the current and/or voltage sensor 64 may be configured to measure the voltage across a heating element 62. In some embodiments, an optional power divider circuit 66 may be configured between the microcontroller 60 and the current and/or voltage sensor 64. Thus, the power of the signal from the current and/or voltage sensor 64 may be reduced to a level as to prevent damage to the microcontroller 60 and/or to provide a more uniform scale of voltages to measure for the detection of the current and/or voltage of the power signal.

The controller 36 may further include a heating element relay 68 to selectively provide the power signal to the heating element 62, as well as a light relay 70 to selectively provide the power signal to the indicator light 32. The heating element relay 68 and light relay 70 may be under the control of the microcontroller 60. In specific embodiments, the heating element relay 68 is a G8P-1A4P-DC24, 30A relay, as distributed by Omron Electronic Components of Schaumburg, Ill. ("Omron"), while the light relay 70 is a G5LA-14-DC24, 10A relay, as also distributed by Omron. The controller 36 may further include a rectifier 72 to rectify the AC power signal into DC power for components of the power controller 36. In specific embodiments, the rectifier 72 is a DF04M diode bridge rectifier as distributed by Fairchild Semiconductor International, Inc., of South Portland, Me.

Figure 3:
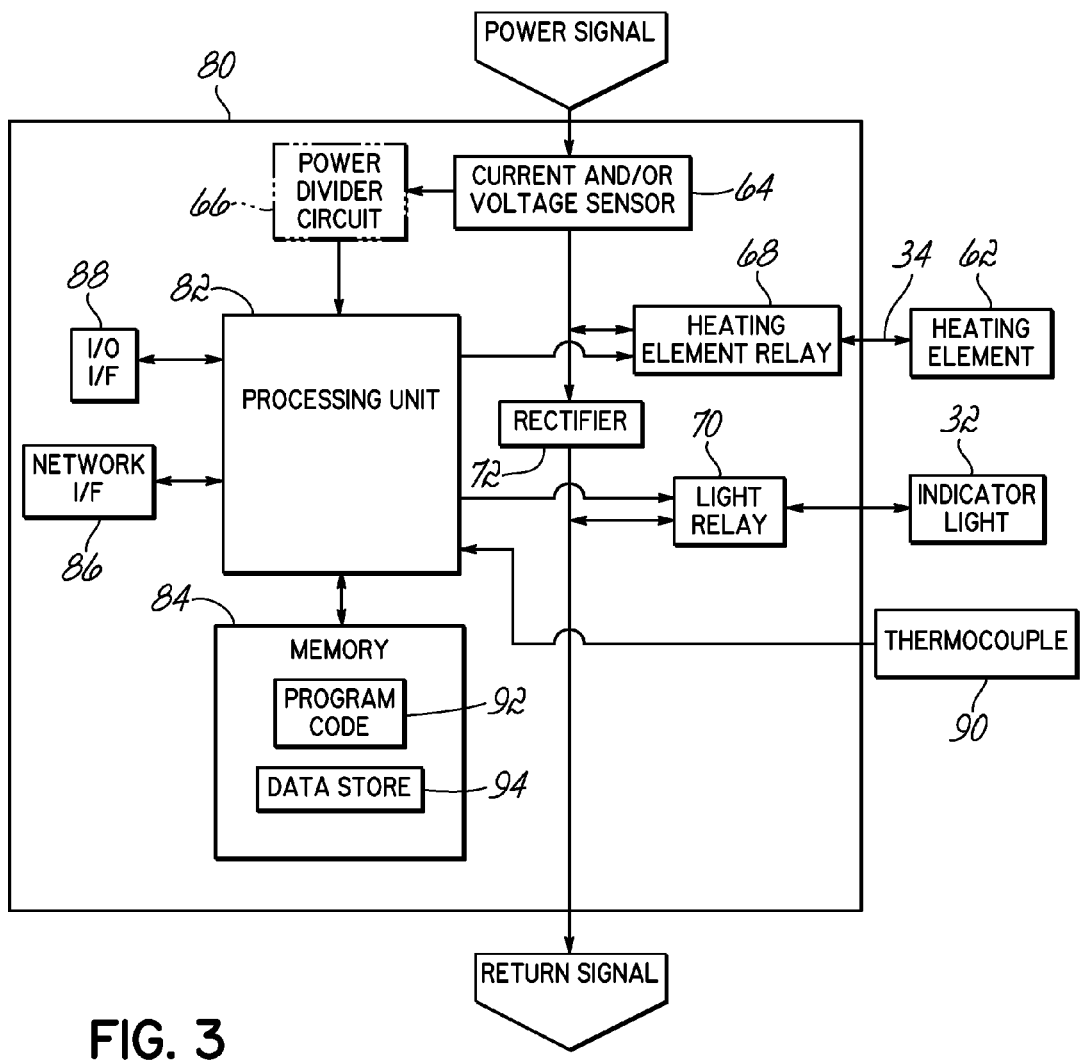
FIG. 3 is a block diagram of another controller than may be used with the cooking appliance of FIG. 1.

It will be appreciated that embodiments of the invention may be disposed in one or more controllers configured to not only selectively activate the heating element 62 and/or indicator light 32, but also configured to operate additional components of the apparatus 10. For example, FIG. 3 is a diagrammatic illustration of another embodiment of a controller 80 consistent with alternative embodiments of the invention. The controller 80 may include at least one processing unit 82 coupled to a memory 84. Each processing unit 82 is typically implemented in hardware using circuit logic disposed in one or more physical integrated circuit devices, or chips. Each processing unit 82 may be one or more microprocessors, micro-controllers, field programmable gate arrays, programmable logic controller (PLC), or ASICs, while memory 84 may include random access memory (RAM), dynamic random access memory (DRAM), static random access memory (SRAM), flash memory, and/or another digital storage medium, and that is also typically implemented using circuit logic disposed in one or more physical integrated circuit devices, or chips. As such, memory 84 may be considered to include memory storage physically located elsewhere in the controller 80, e.g., any cache memory in the at least one processing unit 82, as well as any storage capacity used as a virtual memory, e.g., as stored on a mass storage device, a computer, and/or another terminal coupled to the controller 80, including coupled to the controller 80 through at least one network interface 86 (illustrated as, and hereinafter, "network I/F" 86) by way of at least one network (not shown). It will be appreciated that the at least one network may include at least one private communications network (e.g., such as an intranet) and/or at least one public communications network (e.g., such as the Internet). The controller 80, in turn, may couple to the network through the network I/F 86 with at least one wired and/or wireless connection.

In addition to the network I/F 86, the controller 80 may include at least one input/output interface 88 (illustrated as, and hereinafter, "I/O I/F" 88) configured to communicate with at least one peripheral. Such a peripheral may include at least one of one or more image scanners, barcode readers, RFID readers, monitors, keyboards, mice, printers, and/or other peripherals (none shown). In specific embodiments, the I/O I/F 88 may include at least one peripheral interface, including at least one of one or more serial, universal serial bus (USB), PC Card, VGA, HDMI, DVI, and/or other interfaces (e.g., for example, other computer, communicative, data, audio, and/or visual interfaces) (none shown). Similarly to the controller 36 of FIG. 2, the controller 80 of FIG. 3 may determine the current and/or voltage of a power signal coupled to the heating element 62 through at least one current and/or voltage sensor 64, the signal from which may be received through a power divider circuit 66. Moreover, the controller 80 may include a heating element relay 68 to selectively provide the power signal to the heating element 62, a light relay 70 to selectively provide the power signal to the indicator light 32, and a rectifier 72 to rectify the AC power signal into DC power for components of the controller 80. Additionally, the controller 80 may be coupled to a temperature measuring device 90, and in particular a thermocouple 90, to determine the temperature of the kettle 26.

The controller 80 may be under the control, execute, and/or otherwise rely upon various software applications, components, programs, files, objects, modules, etc. (hereinafter, "program code") consistent with embodiments of the invention. This program code may include an operating system (e.g., such as a Windows Embedded Compact operating system as distributed by Microsoft Corporation of Redmond, Wash.) (not shown) as well as one or more software applications (e.g., configured to operate in an operating system or as "stand-alone" applications). As such, the memory 84 may be configured with at least one application in the form of program code 92 to monitor the current and/or voltage drawn by at least the heating element 62 and/or to monitor the temperature of the kettle 26, then interrupt power to the heating element 62 upon detecting that the apparatus 10 is idle. The memory 84 may be further configured with a data store 94 to store data related to the apparatus 10 and/or controller 80.

Figure 4:
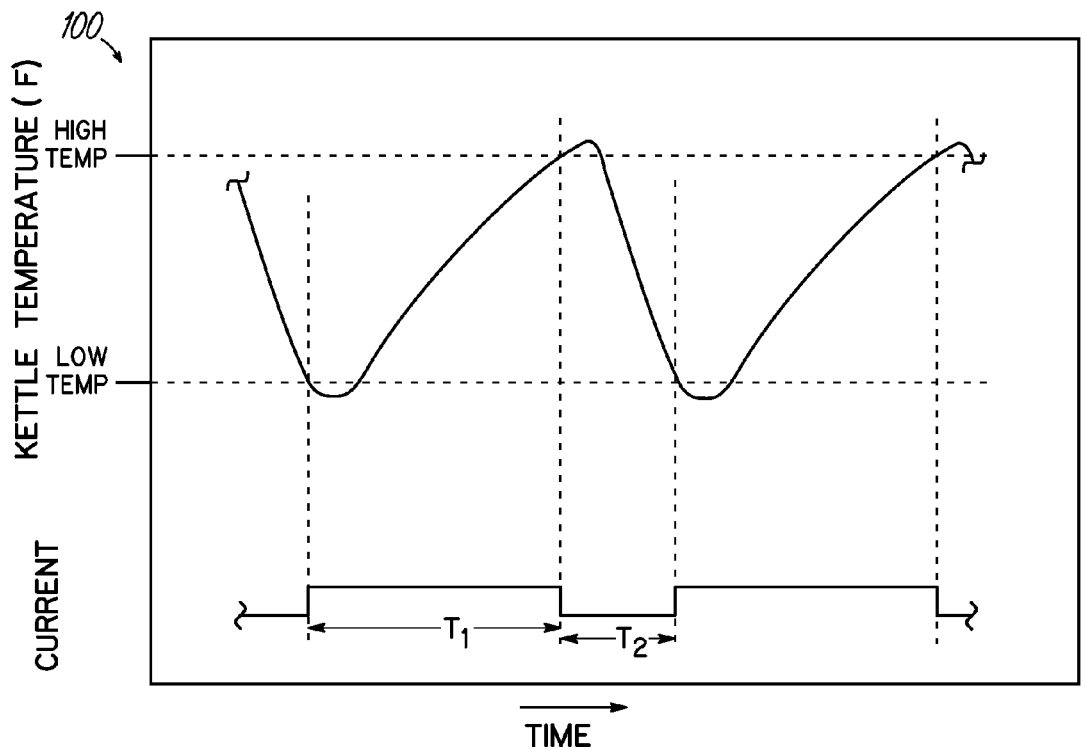
FIG. 4 is a graphic illustration of cycles of cooking sequences in a cooking apparatus and a measurement of current of a power signal therein consistent with embodiments of the invention.

FIG. 4 is a graphic illustration 100 of the current to a heating element 62 and its effect on the temperature of a kettle 26 over time as an apparatus 10 associated therewith is being used to continuously pop loads of popcorn. In particular, the graph 100 illustrates the effects of current, kettle temperature, and time as it applies to an apparatus 10 that is controlled by a controller (e.g., such as, or another controller in conjunction with, controller 36 and/or controller 80) that utilizes temperature and/or current sensing to detect whether to supply and/or disconnect power to the heating element 62. As illustrated, current may be supplied to the heating element 62 by the controller when the kettle temperature reaches a low temperature threshold (consistent with the temperature after popcorn, oil, and/or salt are added to the kettle 26, which lower the kettle temperature to the low temperature threshold) (illustrated as "LOW TEMP") and current may be withheld when the kettle temperature reaches a high temperature threshold (consistent with the end of a popping cycle, and thus a temperature at which to unload popped popcorn) (illustrated as "HIGH TEMP"). As illustrated in FIG. 4, the time to heat the kettle 26 from the low temperature threshold to the high temperature threshold, or T1, is relatively long due to the fact that popcorn, oil, and/or salt must be heated until the popcorn pops at about the high temperature threshold. Moreover, the time to cool the kettle 26 from the high temperature threshold to the low temperature threshold, or T2, is relatively short due to the fact that the addition of popcorn, oil, and/or salt cool the temperature of the kettle 26 relatively quickly.

Figure 5:
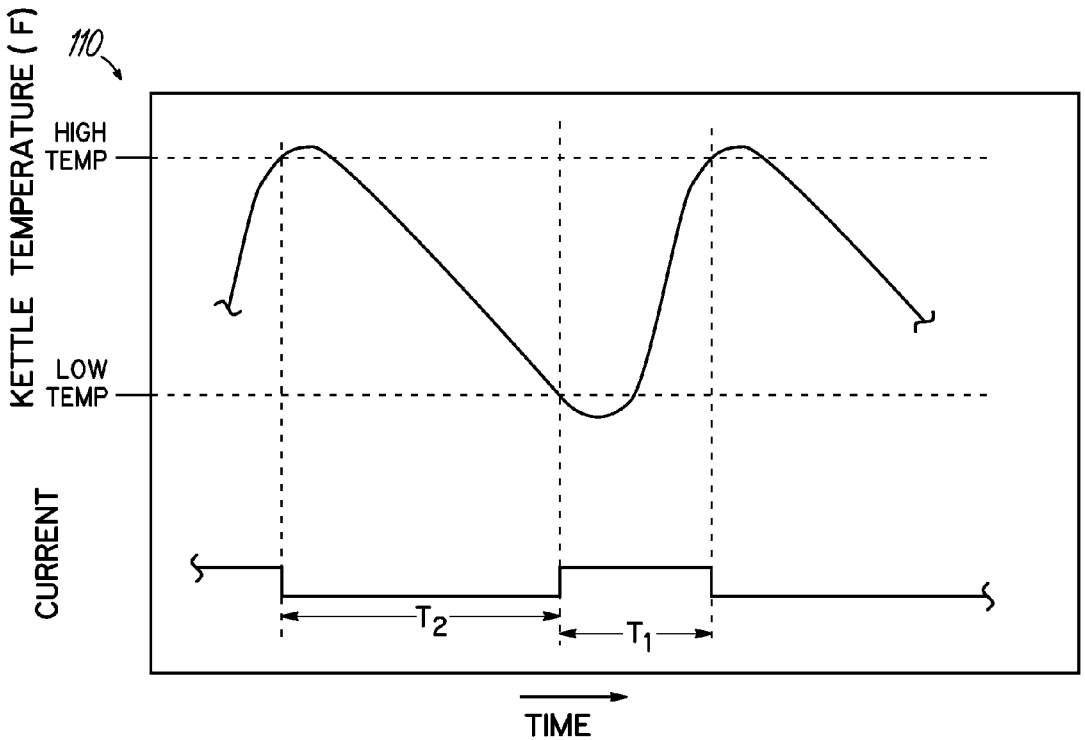
FIG. 5 is a graphic illustration of idle cycles in a cooking apparatus and a measurement of current of a power signal therein consistent with embodiments of the invention.

FIG. 5 is a graphic illustration 110 of the current to a heating element 62 and its effect on the temperature of a kettle 26 over time as an apparatus 10 associated therewith is idle. Similarly to the graph 100 of FIG. 4, the graph 110 of FIG. 5 illustrates the effects of current, kettle temperature, and time as it applies to an apparatus 10 that is controlled by a controller (e.g., such as, or another controller in conjunction with, controller 36 and/or controller 80) that utilizes temperature and/or current sensing to detect whether to supply and/or disconnect power to the heating element 62. Unlike FIG. 4, the graph 110 of FIG. 5 illustrates that the time to heat the kettle 26 from the low temperature threshold to the high temperature threshold, T1, is relatively short due to the fact that there is no popcorn, oil, and/or salt loaded therein. Correspondingly, the time to cool the kettle 26 from the high temperature threshold to the low temperature threshold, T2, is relatively long due to the fact that there is no popcorn, oil, and/or salt to cool the temperature of the kettle 26 relatively quickly.

Figure 6:
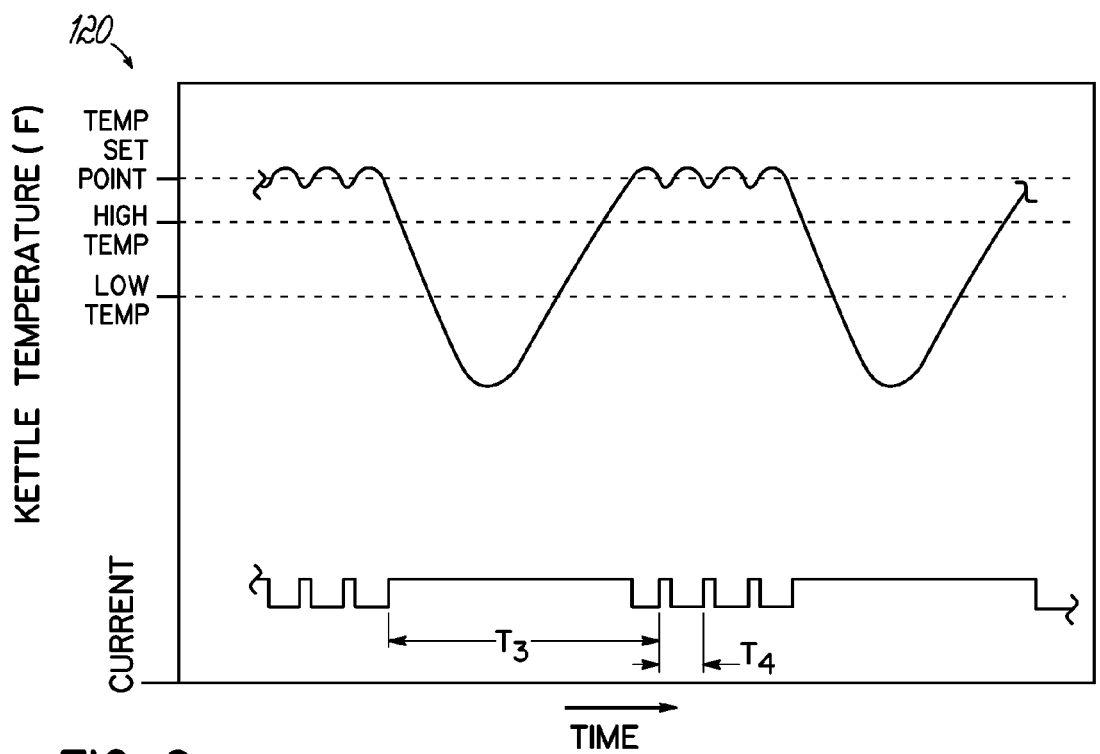
FIG. 6 is a graphic illustration of cycles of cooking sequences in a cooking apparatus and a measurement of current of a power signal therein consistent with embodiments of the invention.

FIG. 6 is a graphic illustration 120 of the current to a heating element 62 and its effect on the temperature of a kettle 26 over time as an apparatus 10 associated therewith is being used to continuously pop loads of popcorn. In particular, the graph 120 illustrates the effects of current, kettle temperature, and time as it applies to an apparatus 10 that is controlled by a controller (e.g., such as, or another controller in conjunction with, controller 80) that utilizes temperature and/or current sensing to detect whether to supply and/or disconnect power to the heating element 62. As illustrated, power may be selectively supplied to the heating element 62 by the controller to maintain the temperature of the kettle 26 about a setpoint temperature (illustrated as "TEMP SETPOINT). Particularly, and as illustrated in FIG. 6, the controller may be configured to maintain the temperature of the kettle within about two to about six degrees around the setpoint temperature by selectively supplying power to the heating element 62 (e.g., "pulsing" the power signal). In some embodiments, the controller may be further configured to selectively provide power to the heating element 62 above a high temperature threshold (illustrated as "HIGH TEMP") and continuously supply current below a low temperature threshold (illustrated as "LOW TEMP"). The high temperature threshold may be a temperature at which a popcorn popping sequence is typically complete (e.g., such as a temperature at which popcorn should be unloaded folio the kettle 26), while the low temperature threshold may be set at a temperature to indicate that the apparatus 10 is in a popcorn popping sequence (e.g., as opposed to a temperature fluctuation). It will be appreciated that, in some embodiments, the setpoint temperature is set above the high temperature threshold, while in alternative embodiments the setpoint temperature is set below the high temperature threshold. In further alternative embodiments, the setpoint temperature may be about the same as the high temperature threshold.

Thus, when the kettle 26 is loaded with popcorn, oil, and/or salt, the temperature of the kettle 26 may drop relatively quickly from the setpoint temperature and/or high temperature threshold, as well as below the low temperature threshold, such that power is continuously applied to the heating element 62 associated therewith to raise the temperature of the kettle 26 to or above the setpoint temperature and/or the high temperature threshold. Thus, the current is maintained for a time threshold, or T3, to bring the popcorn, oil, and/or salt to or above the setpoint temperature and/or high temperature threshold, with T3 being relatively longer than current required to maintain an empty kettle (or kettle full of popped popcorn) at the setpoint temperature and/or high temperature as at T4.

Figure 7:
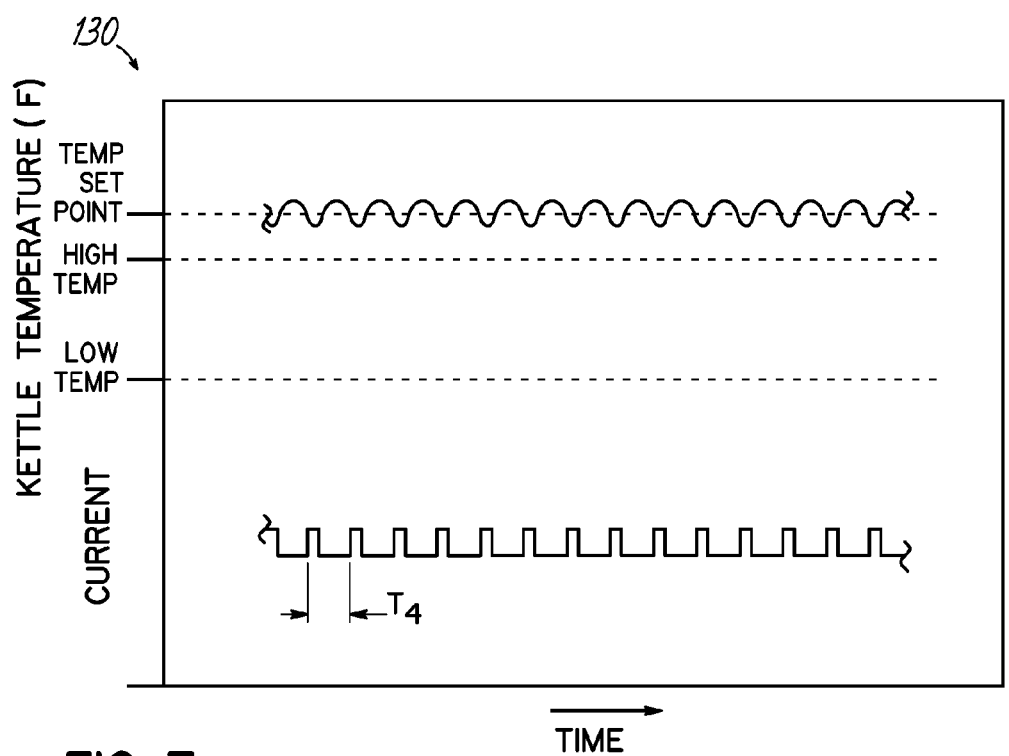
FIG. 7 is a graphic illustration of idle cycles in a cooking apparatus and a measurement of current of a power signal therein consistent with embodiments of the invention.

FIG. 7 is a graphic illustration 130 of the current to a heating element 62 and its effect on the temperature of a kettle 26 over time as an apparatus 10 associated therewith is idle. Similarly to the graph 120 of FIG. 6, the graph 130 of FIG. 7 illustrates the effects of current, kettle temperature, and time as it applies to an apparatus 10 that is controlled by a controller (e.g., such as, or another controller in conjunction with, controller 80) that utilizes temperature and/or current sensing to detect when to supply and/or disconnect power to the heating element 62. Unlike FIG. 6, the graph 130 of FIG. 7 illustrates that there is no continuous application of current to for a time T3, as there is no loading of popcorn, oil, and/or salt in the kettle that may result in a continuous application of current or a dip in the temperature of the kettle below the low temperature threshold. Rather, the current is applied during the relatively short time of T4 in a cyclical manner to maintain the temperature of the kettle about the setpoint temperature and/or the high temperature threshold.

Those having ordinary skill in the art will recognize that the environments illustrated in FIGS. 1-7 are not intended to limit the scope of embodiments of the invention. In particular, the apparatus 10, controller 36 and/or controller 80, as discussed above, may include additional components consistent with embodiments of the invention. Indeed, those having skill in the art will recognize that other alternative hardware and/or software environments may be used without departing from the scope of the invention. For example, the apparatus 10 may include a pump for oil, an oil reservoir, a motor to automatically dump popcorn from the kettle 26 when that popcorn is finished cooking, additional indicators, additional switches, a temperature sensing device, a ventilator, and/or another component consistent with embodiments of the invention. Also for example, the controller 36 and/or the controller 80 may include a plurality of heating element relays to control a corresponding plurality of heating elements 62 selectively and individually. As such, the controller 36 and/or controller 80 may be configured to operate and/or be responsive to at least some of those additional components. Moreover, controller 36 and/or 80 may be used in conjunction with another controller that is configured to operate at least a portion of the apparatus 10, including the heating element 62. As such, the controller 36 and/or 80 may be configured between a relay to supply a power signal to the heating element controlled by the other controller. Alternatively, the controller 36 and/or 80 may be configured to control a power signal to all parts of an apparatus 10 such that the controller 36 and/or 80. As such, the heating element relay 68 may be configured to control power to not only the heating element 62, but other parts of the apparatus 10. Thus, the controller 36 and/or 80 may be configured separate from another controller and configured to control all power to the apparatus 10. Additionally, those having ordinary skill in the art will appreciate that the controller 80 may include more or fewer applications disposed therein.

Furthermore, one having ordinary skill in the art will appreciate that the illustrations of FIGS. 4-7 are merely illustrative and not intended to be limiting. For example, the high temperature thresholds, low temperature thresholds, and setpoint temperatures may be higher and/or lower in alternative embodiments of the invention. Moreover it will be appreciated that the current supplied to a heating element 62 may vary over time (for example, the resistivity of the heating element 62 may vary as the heating element heats up, and thus the current to the heating element 62 may be correspondingly changed), and thus the indication of the current associated with a power signal to the heating element 62 is merely illustrative. One having ordinary skill in the art will appreciate that the current to the heating element 62 may be compared to a current threshold, which is typically set above zero current, and particularly above a value of current required to supply power to the controller and/or indicator light, but below a value of current typically drawn by a heating element 62. As such, other alternative hardware environments may be used without departing from the scope of embodiments of the invention.

The routines executed to implement the embodiments of the invention, whether implemented as part of an operating system or a specific application, component, program, object, module or sequence of instructions (e.g., in the form of separate program code executed by a processing unit or configured in a microcontroller) executed by one or more controllers may be referred to herein as a "sequence of operations," a "program product," or, more simply, "program code." The program code typically comprises one or more instructions that are resident at various times in various memory and storage devices in a controller, and that, when read and executed by one or more microcontrollers and/or processing units of a controller, cause that controller to perform the steps necessary to execute steps, elements, and/or blocks embodying the various aspects of the invention.

While the invention has and hereinafter will be described in the context of various controllers, those skilled in the art will appreciate that the various embodiments of the invention are capable of being distributed as a program product in a variety of forms and that embodiments of the invention apply equally regardless of the particular type of computer readable signal bearing media used to actually carry out the distribution. Examples of computer readable signal bearing media include but are not limited to physical and tangible recordable type media such as volatile and nonvolatile memory devices (e.g., solid state drives, USB drives, etc.), tapes, floppy and other removable disks, hard disk drives, optical disks (e.g., CD-ROM's, DVD's, Blu-Ray Discs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Figure 8:
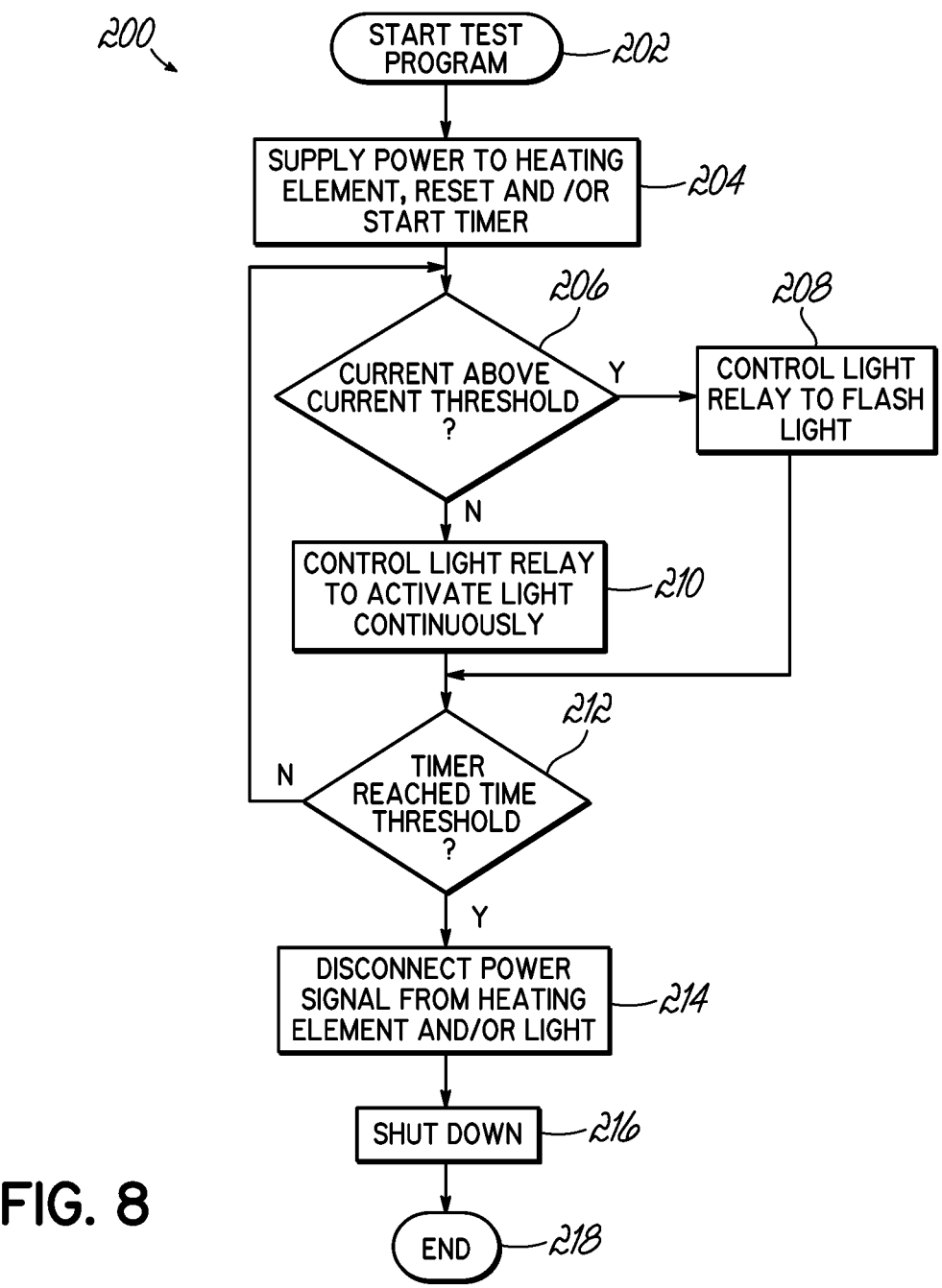
FIG. 8 is a flowchart illustrating a debugging sequence of operations that may be executed by the controller of FIG. 2 or FIG. 3.

FIG. 8 is a flowchart 200 illustrating a sequence of operations to test operations of a controller consistent with embodiments of the invention. As such, the sequence of operations may be used in a "debug" mode to ensure the correct operations of the controller. The debug mode may be entered by shorting an input of a microcontroller and/or processing unit of the controller to a ground signal and/or to a voltage signal. Thus, upon power being supplied to the controller and the input to the microcontroller and/or processing unit being shorted, the controller may begin a test program (block 202). The controller may thus supply a power signal to heating element, thereby activating the heating element, as well as resetting and/or starting an internal timer (block 204). In some embodiments, the controller may set the internal timer for about fifteen seconds, while in alternative embodiments the controller may simply start the timer. The controller may then determine whether the current component of the power signal to the heating element is above a current threshold (block 206). When the current to the heating element is above the current threshold ("Yes" branch of decision block 206) the controller may control a light relay to selectively supply a power signal to an indicator light to flash the light (block 208). When the current is not above a current threshold ("No" branch of decision block 206) the controller may simply activate a light relay to supply a continuous power signal to the indicator light (block 210).

After the light relay has been controlled to flash the indicator light (block 208) or after the light relay has been controlled to continuously activate the indicator light (block 210), the controller may determine if the timer has reached a first time threshold (block 212). For example, and as discussed above, the controller may simply activate the timer and the time threshold may be fifteen seconds. Alternatively, the controller may set the timer to fifteen seconds and the time threshold may be zero. Thus, when the timer has not reached the time threshold ("No" branch of decision block 212) the sequence of operations may return to block 206. When the timer has reached the time threshold ("Yes" branch of decision block 212) the controller may disconnect the power signal from the heating element (e.g., by preventing a heating element relay from supplying the power signal to the heating element) and/or the indicator light (e.g., by preventing the light relay from supplying the power signal to the indicator light) (block 214). The controller may also commence shut-down operations (block 216) and the sequence of operations may end (block 218).

Figure 9:
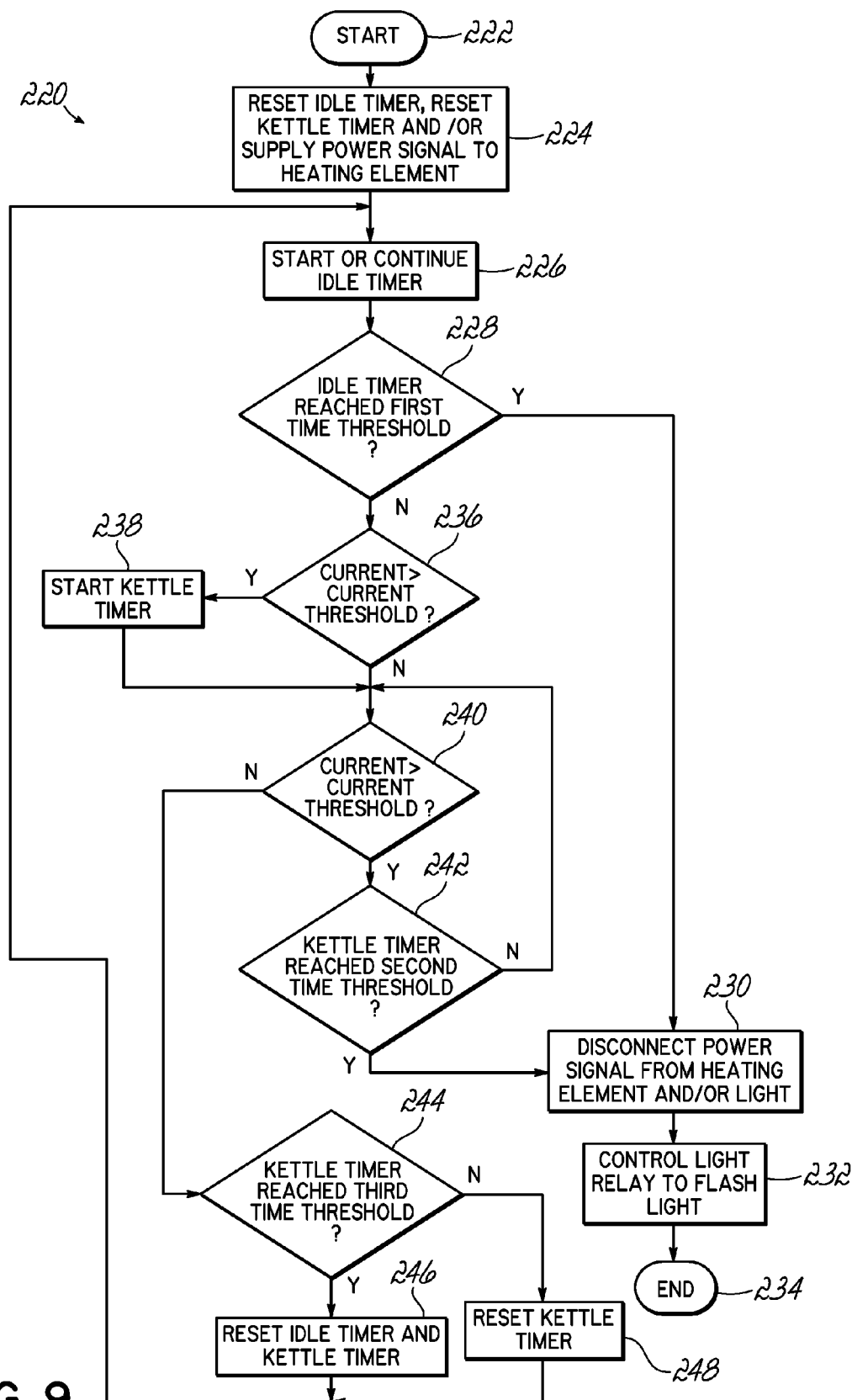
FIG. 9 is a flowchart illustrating a sequence of operations that may be executed by the controller of FIG. 2 or FIG. 3 to control power to at least a portion of an apparatus based on determining whether the current consumed by the at least a portion of the apparatus indicates that the apparatus is idle.

FIG. 9 is a flowchart 220 illustrating a sequence of operations to control the supply of a power signal to a heating element of a kettle and/or an indicator light consistent with embodiments of the invention. In particular, the sequence of operations of FIG. 9 may be used with a controller of the type that is configured to determine the current drawn by the heating element. Specifically, the sequence of operations of FIG. 9 may be used when a controller is not configured in a debug mode. As such, the sequence of operations may begin (block 222) and the controller may reset an idle timer, reset a kettle timer, and supply a power signal to a heating element (block 224). The controller may then start the idle timer (block 226). In some embodiments, the controller may wait for about five seconds after initially supplying the power signal to the heating element before activating the idle timer.

The idle timer may be used to determine if an apparatus is idle. For example, a first time threshold may be used to determine whether an apparatus is idle. Typically, an apparatus is idle if it is not used for about fifteen minutes. Thus, the first time threshold may be a time that indicates that the apparatus is idle, and in specific embodiments the first time threshold may be about fifteen minutes. As such, the controller may determine if the idle timer has reached the first time threshold (block 228). When the idle timer has reached the first time threshold (e.g., the idle time has reached about fifteen minutes) ("Yes" branch of decision block 228) the controller may disconnect the power signal from the heating element (e.g., by preventing a heating element relay from supplying the power signal to the heating element) (block 230) and control a light relay to selectively supply a power signal to an indicator light to flash the light (block 232). In some embodiments, the sequence of operations may then end (block 234) while in alternative embodiments the sequence of operations may end when power is no longer supplied to the controller.

Returning to block 228, when the idle timer has not reached the first time threshold ("No" branch of decision block 228)

the current of the power signal may be compared to a current threshold to determine if the current of the power signal is greater than a current threshold (block 236). The current threshold may be a value above zero current, and particularly above a value of current required to supply power to the controller and/or indicator light, but below a value of current typically drawn by a heating element. As such, current greater than the current threshold typically indicates that the heating element is consuming power and increasing the temperature of itself, the kettle, and/or contents therein. Thus, when the controller determines that the value of the current is higher than the current threshold ("Yes" branch of decision block 236) the controller may start a kettle timer (block 238).

After determining that the value of the current is not higher than the current threshold ("No" branch of decision block 236) or after starting a kettle timer (block 238), the controller may wait for a short time (e.g., such as about two to three seconds) and/or determine whether the value of the current exceeds the current threshold again (block 240). When the value of the current is less than the current threshold ("Yes" branch of block 240) the controller may determine whether the kettle timer has reached a second time threshold (block 242). For example, the second time threshold may be used to determine whether there is a fault with the apparatus. Typically, it takes from about three to about four minutes to cook a load of popcorn. Thus, the second time threshold may be a time that would indicate that there is a fault with the apparatus such that the heating element is activated for too long (e.g., because of an electrical fault by another controller otherwise controlling the power supplied to the heating element and/or because of inappropriate ingredients that take too long to cook), and in specific embodiments the second time threshold may be set for about five minutes. When the kettle timer has reached the second time threshold ("Yes" branch of decision block 242) the controller may determine that there is a fault with the apparatus and proceed to block 230. When the kettle timer has not reached the second time threshold ("No" branch of decision block 242) the controller may again determine whether the value of the current is greater than the current threshold (block 240).

At block 240, when the value of the current is not greater than the current threshold ("No" branch of decision block 240), the controller may determine whether the kettle timer has reached a third time threshold (block 244). For example, the third time threshold may be used to determine whether a power signal was supplied to the heating element long enough to actually cook a load of popcorn, either partially or fully, or whether the power signal was supplied to the heating element only for enough time to bring the temperature of an empty kettle to its high temperature threshold. More specifically, a user may load a kettle with less than the recommended full amount of popcorn, oil, and/or salt, thus utilizing less time than normal to cook the popcorn. Thus, the third time threshold may be a time that indicates some or all of a load has been cooked (e.g., some or all of a load of popcorn that is the same or less than that recommended) but that is longer than it typically takes an empty kettle to heat to a high temperature and/or setpoint temperature (e.g., which may be about ninety seconds), and in specific embodiments the third time threshold may be set for about two minutes. When the kettle timer has reached the third time threshold ("Yes" branch of decision block 244) the controller may determine that the apparatus has not been idle (e.g., because the heating element was activated for longer than a period of time corresponding an idle cycle yet shorter than a period of time corresponding to a fault) and reset the idle timer and the kettle timer (block 246). When the kettle timer has not reached the third time threshold ("No" branch of decision block 244) the controller may determine that the apparatus is idle (e.g., because the heating element was activated for shorter than a period of time corresponding an idle cycle) and reset the kettle timer (block 248). After resetting the idle timer and the kettle timer (block 246), or after resetting only the kettle timer (block 24R), the sequence of operations may return to block 226 to start or continue the idle timer, respectively.

Thus, and with respect to FIG. 9, a controller may determine that an apparatus has been idle when the current draw for a heating element is too short, determine that the apparatus is operating normally with respect to various conditions thereof, and/or determine that the apparatus has suffered a fault.

Figure 10:
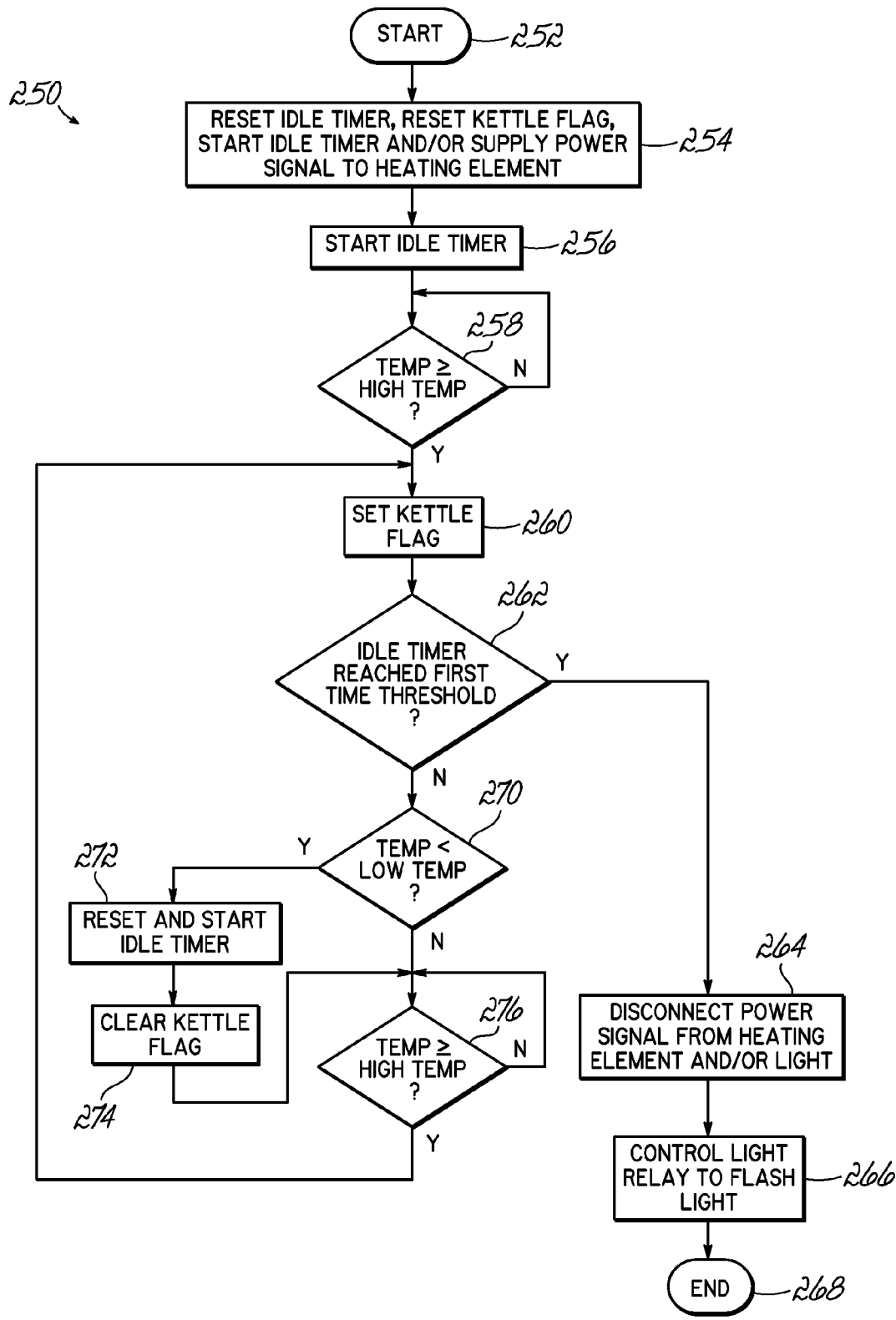
FIG. 10 is a flowchart illustrating a sequence of operations that may be executed by the controller of FIG. 3 to control power to at least a portion of an apparatus based on determining whether the temperature associated with at least a portion of the apparatus indicates that the apparatus is idle.

FIG. 10 is a flowchart 250 illustrating a sequence of operations to control the supply of a power signal to a heating element of a kettle and/or indicator light consistent with embodiments of the invention. In particular, the sequence of operations of FIG. 10 may be used with a controller of the type that determines the temperature of a kettle with a digital temperature sensor. Specifically, the sequence of operations of FIG. 10 may be used when the controller is not configured in a debug mode. As such, the sequence of operations may begin (block 252) and the controller may reset an idle timer, reset a kettle flag (e.g., a bit of memory with the bit being a logic high to indicate the presence or setting of the kettle flag and, correspondingly, the bit being a logic low to indicate the absence or clearing of the kettle flag), and supply a power signal to a heating element (block 254). The controller may then start the idle timer (block 256). In some embodiments, the controller may wait for about five seconds after initially supplying the power signal to the heating element before activating the idle timer. The controller may then determine whether the temperature of the kettle is equal to or greater than a high temperature threshold (block 258).

The high temperature threshold is typically a temperature at which a popcorn popping sequence may begin, and may be about 400° Fahrenheit. Upon start-up, it may be advantageous to have the kettle reach the high temperature so as to decrease the overall time to pop popcorn. Thus, when the kettle temperature is not equal to or greater than the high temperature threshold ("No" branch of decision block 258) the controller may wait for a few seconds ("wait" block not shown) and determine the temperature of the kettle again (block 258). When the kettle temperature is equal to or greater than the high temperature threshold ("Yes" branch of decision block 258), the controller may set a kettle flag (block 260). The controller may then determine if the idle timer has reached a first time threshold (block 262).

Again, and in some embodiments, the idle timer may be used to determine if an apparatus upon which the controller is configured is idle. For example, the controller may determine that the apparatus is idle if the idle timer reaches a first time threshold of about fifteen minutes. Thus, when the idle timer has reached the first time threshold (e.g., the idle time has reached about fifteen minutes) ("Yes" branch of decision block 262) the controller may disconnect the power signal from the heating element (e.g., by preventing a heating element relay from supplying the power signal to the heating element) (block 264) and control a light relay to selectively supply a power signal to an indicator light to flash the light (block 266). In some embodiments, the sequence of operations may then end (block 268) while in alternative embodiments the sequence of operations may end when power is no longer supplied to the controller.

Returning to block 262, when the idle timer has not reached the first time threshold ("No" branch of decision block 262)

the controller may determine whether the temperature is below a low temperature threshold (block 270). In some embodiments, the low temperature threshold is typically a temperature below the high temperature threshold but above the average minimum of the kettle during a popping sequence (e.g., the average minimum temperature that the addition of popcorn, oil, and/or salt cause the kettle to experience during a popcorn popping sequence). In some embodiments, the low temperature threshold is less than about 95% of the high temperature threshold and, in specific embodiments, may be about 375° Fahrenheit. Thus, when the temperature of the kettle is below the low temperature threshold (and in particular after having been at or above the high temperature threshold) ("Yes" branch of decision block 270), the controller may determine that the apparatus is not idle and, as such, the controller may reset and start the idle timer (block 272) as well as clear the kettle flag (block 274).

After determining that the temperature is not less than the low temperature threshold ("No" branch of decision block 270) and/or after clearing the kettle flag, the controller may again deter mine whether the kettle temperature is greater than or equal to the high temperature threshold (block 276). When the kettle temperature is not greater than or equal to the high temperature threshold ("No" branch of decision block 276) the controller may wait for a few seconds and/or determine the temperature of the kettle again (block 276). When the temperature is greater than or equal to the high temperature threshold (e.g., such as having reached the end of a popcorn popping sequence) ("Yes" branch of decision block 276), the sequence of operations may return to block 260 to again set the kettle flag.

Thus, and with respect to FIG. 10, a controller may determine that an apparatus has been idle when the temperature of a kettle is high for too long and/or determine that the apparatus is operating normally.

While embodiments of the invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. For example, and regarding FIG. 9, one having ordinary skill in the art will appreciate that a controller may be configured to control power to the heating element and/or indicator light based upon measuring the voltage of a power signal supplied to a heating element. Also for example, and regarding FIG. 10, one having ordinary skill in the art will appreciate that there may be additional determinations as to whether an idle timer has been reached. More specifically, the controller may determine whether an idle timer has been reached after determining that the temperature is not greater than or equal to a high temperature threshold ("No" branches of decision blocs 258 and/or 276) such that if the idle timer reaches the first time threshold, the power signal is disconnected from the heating element and a light relay is controlled to flash an indicator light. In this manner, in the event that a heating element is deficient and/or otherwise unable to reach the high temperature threshold, power may be prevented therefrom and the indicator light may be flashed. Moreover, one having ordinary skill in the art will appreciate that the kettle flag may be used to determine when to measure a temperature of the kettle. For example, at block 270 the sequence of operations may continuously read the temperature of the kettle while the kettle flag is set such that it only proceeds to block 272 if the kettle temperature is below the low temperature threshold rather than moving immediately from block 272 to block 276. Furthermore, one having ordinary skill in the art will appreciate that the sequence of operations in FIG. 10 may be further augmented such that, at block 270, the kettle temperature may be continuously read and proceed directly to block 264 if the kettle temperature does not drop below the low temperature threshold within the first time threshold for the idle timer.

Additionally, one having ordinary skill in the art will appreciate that embodiments of the present invention are not limited to a popcorn popping apparatus. In alternative embodiments, the apparatus may be a flyer, an oven, a baker, an immersion circulator, and/or another cooking appliance that uses a heating element as is well known in the art. Thus, the invention in its broader aspects is therefore not limited to the specific details, representative apparatuses, and/or methods shown and described. In particular, any of the blocks of the above flowcharts may be deleted, augmented, made to be simultaneous with another, combined, or be otherwise altered in accordance with the principles of alternate embodiments of the invention. Accordingly, departures may be made from such details without departing from the scope of applicants' general inventive concept.

Other modifications will be apparent to one of ordinary skill in the art. Therefore, the invention lies in the claims hereinafter appended.

What is claimed is:

1. An apparatus for controlling a power signal to at least a portion of a cooking appliance, comprising:
   a controller having an input configured to be electrically coupled to the power signal and an output configured to be selectively electrically coupled to at least one heating element of the cooking appliance to apply the power signal thereto,
   the controller being configured to activate the at least one heating element of the cooking appliance by coupling the at least one heating element of the cooking appliance to the output to apply the power signal thereto, monitor a current value of the power signal, and selectively de-couple the power signal from the at least one heating element in response to determining that the current value has failed to exceed a predetermined current threshold within a predetermined time threshold from a starting current value below the predetermined current threshold.

2. The apparatus of claim 1, wherein the controller is further configured to selectively de-couple the power signal from the cooking appliance in response to determining that the current value has failed to exceed the predetermined current threshold within the predetermined time threshold from the starting current value below the predetermined current threshold.

3. The apparatus of claim 1, wherein the controller is further configured to selectively de-couple the power signal from the at least one heating element of the cooking appliance in response to determining that the current value has failed to drop below the predetermined current threshold within a second predetermined time threshold from a starting current value above the predetermined current threshold.

4. An apparatus for controlling a power signal to at least a portion of a cooking appliance, comprising:
   a controller having an input configured to be electrically coupled to the power signal and an output configured to be selectively electrically coupled to at least one heating element of the cooking appliance to apply the power signal thereto, the controller being configured to activate the at least one heating element of the cooking appliance by coupling the at least one heating element of the cooking appliance to the output to apply the power signal thereto, monitor a voltage value of the power signal, and selectively de-couple the power signal from the at least one heating element in response to determining that the voltage value has failed to exceed a predetermined voltage threshold within a first predetermined time threshold from a starting voltage value below the predetermined voltage threshold.

5. The apparatus of claim 4, wherein the controller is further configured to selectively de-couple the power signal from the cooking appliance in response to determining that the voltage value has failed to exceed the predetermined voltage threshold within the first predetermined time threshold from the starting voltage value below the predetermined voltage threshold.

6. The apparatus of claim 4, wherein the controller is further configured to selectively de-couple the power signal from the at least one heating element of the cooking appliance in response to determining that the voltage value has failed to drop below the predetermined voltage threshold within a second predetermined time threshold from a starting voltage value above the predetermined voltage threshold.

7. An apparatus for controlling a power signal to a heating element of a cooking appliance, comprising:
a controller having an input configured to be electrically coupled to the power signal and an output configured to be selectively electrically coupled to the heating element of the cooking appliance to apply the power signal thereto,
the controller being configured to activate the heating element of the cooking appliance by applying the power signal thereto, monitor a temperature associated with the cooking appliance, and selectively de-couple the power signal from the heating element in response to determining that the temperature has failed to drop below a predetermined temperature threshold within a predetermined time threshold from a starting point above the predetermined temperature threshold.

8. The apparatus of claim 7, wherein the controller is further configured to selectively de-couple the power signal from the cooking appliance in response to determining that the temperature has failed to drop below the predetermined temperature threshold within the predetermined time threshold from the starting point above the predetermined temperature threshold.

9. A method of controlling power to at least a portion of a cooking appliance, the method comprising:
applying a power signal to a heating element of the cooking appliance;
monitoring a current value of the power signal; and
in response to determining that the current value has failed to exceed a predetermined current threshold within a first predetermined time threshold from a starting current value below the predetermined current threshold, selectively interrupting the power signal to the heating element of the cooking appliance.

10. The method of claim 9, wherein selectively interrupting the power signal to the heating element of the cooking appliance comprises:
selectively interrupting the power signal to the cooking appliance.

11. The method of claim 9, further comprising:
in response to determining that the current value has failed to drop below the predetermined current threshold within a second predetermined time threshold from a starting current value above the predetermined current threshold, selectively interrupting the power signal to the heating element of the cooking appliance.

12. A method of controlling power to at least a portion of a cooking appliance, the method comprising:
applying a power signal to a heating element of the cooking appliance;
monitoring a voltage value of the power signal; and
in response to determining that the voltage value has failed to exceed a predetermined voltage threshold within a first predetermined time threshold from a starting voltage value below the predetermined voltage threshold, selectively interrupting the power signal to the heating element of the cooking appliance.

13. The method of claim 12, wherein selectively interrupting the power signal to the heating element of the cooking appliance comprises:
selectively interrupting the power signal to the cooking appliance.

14. The method of claim 12, further comprising:
in response to determining that the voltage value has failed to drop below the predetermined voltage threshold within a second predetermined time threshold from a starting voltage value above the predetermined voltage threshold, selectively interrupting the power signal to the at least a portion of the cooking appliance.

15. A method of controlling power to at least a portion of a cooking appliance, the method comprising:
monitoring a current value of a power signal applied to a heating element of the cooking appliance; and
in response to determining that the current value has failed to drop below a predetermined current threshold within a predetermined time threshold from a starting current value above the predetermined current threshold, selectively interrupting the power signal to the heating element of the cooking appliance.

16. The method of claim 15, wherein selectively interrupting the power signal to the heating element of the cooking appliance comprises:
selectively interrupting the power signal to the cooking appliance.

17. A method of controlling power to at least a portion of a cooking appliance, the method comprising:
monitoring a voltage value of a power signal applied to a heating element of the cooking appliance; and
in response to determining that the voltage value has failed to drop below a predetermined voltage threshold within a predetermined time threshold from a starting voltage value above the predetermined voltage threshold, selectively interrupting the power signal to the heating element of the cooking appliance.

18. The method of claim 17, wherein selectively interrupting the power signal to the heating element of the cooking appliance comprises:
selectively interrupting the power signal to the cooking appliance.

19. A method of controlling power to a heating element of a cooking appliance, the method comprising:
activating the heating element of the cooking appliance by applying a power signal thereto;
monitoring a temperature associated with the cooking appliance; and
in response to the temperature failing to drop below a predetermined temperature threshold from a starting point above the predetermined temperature threshold within a predetermined time threshold, selectively interrupting the power signal to the heating element of the cooking appliance.

20. The method of claim 19, wherein selectively interrupting the power signal to the heating element of the cooking appliance comprises:

selectively interrupting the power signal to the cooking appliance.

\* \* \* \* \*